US007978672B2

(12) United States Patent
Draves, Jr. et al.

(10) Patent No.: US 7,978,672 B2
(45) Date of Patent: Jul. 12, 2011

(54) SYSTEM AND METHOD FOR LINK QUALITY SOURCE ROUTING

(75) Inventors: Richard Powell Draves, Jr., Seattle, WA (US); Brian D. Zill, Redmond, WA (US); Jitendra D. Padhye, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/689,626

(22) Filed: Jan. 19, 2010

(65) Prior Publication Data

US 2010/0118727 A1     May 13, 2010

Related U.S. Application Data

(60) Continuation of application No. 11/906,497, filed on Oct. 2, 2007, now Pat. No. 7,680,091, which is a division of application No. 10/784,687, filed on Feb. 23, 2004, now Pat. No. 7,376,122.

(51) Int. Cl.
*H04W 4/00*     (2009.01)

(52) U.S. Cl. ........................................ 370/338; 370/352

(58) Field of Classification Search .................. 370/252, 370/328, 338, 352, 351, 469, 471, 389, 392, 370/229, 230, 235
See application file for complete search history.

(56) References Cited

U.S. PATENT DOCUMENTS

| | | | |
|---|---|---|---|
| 7,065,376 B2 | 6/2006 | Wolman et al. | |
| 7,092,391 B2 * | 8/2006 | Umeda | 370/392 |
| 7,184,421 B1 | 2/2007 | Liu et al. | |
| 7,310,335 B1 * | 12/2007 | Garcia-Luna-Aceves et al. | 370/390 |
| 2002/0039357 A1 * | 4/2002 | Lipasti et al. | 370/338 |
| 2003/0202476 A1 * | 10/2003 | Billhartz et al. | 370/236 |
| 2003/0212821 A1 | 11/2003 | Gillies et al. | |
| 2004/0022223 A1 | 2/2004 | Billhartz | |
| 2004/0025018 A1 * | 2/2004 | Haas et al. | 713/168 |
| 2004/0032847 A1 | 2/2004 | Cain | |
| 2004/0156345 A1 * | 8/2004 | Steer et al. | 370/338 |
| 2004/0190468 A1 * | 9/2004 | Saijonmaa | 370/312 |
| 2004/0213198 A1 * | 10/2004 | Mahmood et al. | 370/349 |
| 2004/0264503 A1 | 12/2004 | Draves | |
| 2005/0036486 A1 * | 2/2005 | Sahinoglu et al. | 370/389 |
| 2005/0036616 A1 | 2/2005 | Huang et al. | |
| 2005/0041591 A1 * | 2/2005 | Duggi et al. | 370/238 |

(Continued)

OTHER PUBLICATIONS

Adya et al., "A Multi-Radio Unification Protocol for IEEE 802.11 Wireless Networks," Technical Report MSR-TR-2003-44. Microsoft Research, Redmond, WA, Jul. 2003.

(Continued)

*Primary Examiner* — Brian D Nguyen
(74) *Attorney, Agent, or Firm* — Wolf, Greenfield & Sacks, P.C.

(57) ABSTRACT

Systems and methods for routing packets by nodes in an ad hoc network in accordance with a link quality source routing protocol are disclosed. Route discovery, route maintenance, and metric maintenance are designed to propagate and keep current link quality measurements. Metric maintenance includes a reactive approach for links that a node is currently using to route packets, and a proactive mechanism for all links. Nodes are configured to include a send buffer, a maintenance buffer, a request table, link quality metric modules, and preferably a neighbor cache and a link cache. The invention allows for asymmetric links in the network. The invention may be implemented within a virtual protocol interlayer between the link and network layers. The invention may employ any particular link quality metrics, including metrics based on probing techniques as well as metrics based on knowledge gained in other ways.

18 Claims, 9 Drawing Sheets

U.S. PATENT DOCUMENTS

2005/0147114 A1* 7/2005 Stewart et al. ............... 370/432

OTHER PUBLICATIONS

Bardford et al., "Generating Representative Web Workloads for Network and Server Performance Evaluation," ACM SIGMETRICS, Madison, WI, Nov. 1998.

Broch et al., "A Performance Comparison of Multi-Hop Wireless Ad Hoc Network Routing Protocols," Proc. $4^{th}$ ACM Int'l Conf. on Mobile Computing and Networking (MobiCom '98), Dallas, TX, Oct. 1998.

De Couto et al., "A High-Throughput Path Metric for Multi-Hop Wireless Routing," Proc. $9^{th}$ ACM Int'l. Conf. on Mobile Computing and Networking (MobiCom '03), San Diego, CA, Sep. 2003.

De Couto et al., "Performance of Multihop Wireless Networks: Shortest Path Is Not Enough," Proc. $1^{st}$ Workshop on Hot Topics in Networking (HotNets-I), Princeton, NJ, Oct. 2002.

Draves et al., "Comparison of Routing Metrics for Multi-Hop Wireless Networks," Microsoft Research, Redmond WA, submitted to MobiSys 2004 Conference Oct. 31, 2003.

Johnson et al., "The Dynamic Source Routing Protocol for Mobile Ad Hoc Networks (DRS)," IETF MANET Working Group Internet Draft, Reston, VA Feb. 21, 2002.

Johnson et al., "Dynamic Source Routing in Ad Hoc Wireless Networks," *Mobile Computing*, T. Imielinski & H, Korth, eds., Kluwer Academic Publishers, Dordrecht, Netherlands (1996).

Karrer et al., "Enabling Large-Scale Wireless Broadband: The Case For TAPs," Proc. $2^{nd}$ Workshop on Hot Topics in Networks (HotNets-II), Cambridge, MA, Nov. 2003.

Keshav, "A Control-Theoretic Approach to Flow Control," Proc. ACM Conf. on Computer Architecture and Protocols (SIGCOMM '91), Zurich, Switzerland, Sep. 1991.

Park et al., "On the Relationship Between File Sizes: Transport Protocols and Self-Similar Network Traffic," Proc. IEEE Int'l. Conf. on Network Protocols (ICNP '96), Columbus, OH, Oct. 1996.

Park et al., "A Highly Adaptive Distributed Routing Algorithm for Mobile Wireless Networks," Proc. IEEE INFOCOM '97, Kobe, Japan, Apr. 1997.

Perkins et al., "Highly Dynamic Destination-Sequenced Distance-Vector Routing (DSDV) for Mobile Computers," Proc. ACM Conf. on Communications Architectures, Protocols and Applications (SIGCOMM '94), London, England, Sep. 1994.

Perkins et al., "Ad-Hoc On-Demand Distance Vector Routing," Proc. $2^{nd}$ IEEE Workshop on Mobile Computing Systems and Applications (WMCSA '99), New Orleands, LA, Feb. 1999.

Woo et al., "Evaluation of Efficient Link Reliability Estimators for Low-Power Wireless Networks," Tech. Report UCB//CSD-03-1270, Univ. Calif. Berkeley Computer Science Division, Berkeley, CA, Sep. 2003.

Woo et al., "Taming the Underlying Challenges of Reliable Multihop Routing in Sensor Networks," Proc. $1^{st}$ ACM Int'l. Conf. on Embedded Networked Sensor Systems (SenSys 2003), Los Angeles, CA, Nov. 2003.

Zhao et al., "Understanding Packet Delivery Performance in Dense Wireless Sensor Networks," Proc. $1^{st}$ ACM Int'l. Conf. on Embedded Networked Sensor Systems (SenSys 2003), Los Angeles, CA, Nov. 2003.

* cited by examiner

RTT PROBE SEND OPERATION

RTT PROBE RECEIVE OPERATION

PKTPAIR SEND OPERATION

PKTPAIR - Receive Probes

PKTPAIR - Receive Probe Reply

ETX SEND OPERATION

ETX RECEIVE OPERATION

SYSTEM AND METHOD FOR LINK QUALITY SOURCE ROUTING

RELATED APPLICATIONS

This application is a continuation of U.S. application Ser. No. 11/906,497, entitled "SYSTEM AND METHOD FOR LINK QUALITY SOURCE ROUTING" filed on Oct. 2, 2007, now U.S. Pat. No. 7,680,091, which is a divisional of U.S. application Ser. No. 10/784,687, entitled "SYSTEM AND METHOD FOR LINK QUALITY SOURCE ROUTING" filed on Feb. 23, 2004, now U.S. Pat. No. 7,376,122, each of which is herein incorporated by reference in its entirety.

TECHNICAL FIELD OF THE INVENTION

The present invention pertains generally to computer networks, and more particularly to routing protocols for ad hoc networks.

BACKGROUND OF THE INVENTION

Ad hoc networks are self-organizing networks in which nodes cooperatively maintain network connectivity. Typically, nodes in an ad hoc network are equipped with radio transceivers, allowing them to communicate wirelessly with one another without requiring centralized network administration or fixed network infrastructure such as base stations or access points. Since each wireless transceiver has a limited effective range, two distant nodes must communicate across multi-hop paths. Intermediary nodes in the path act as routers by forwarding packets originating from the source node initiating the communication to the intended destination node.

In computer networks, routing generally refers to the problem of selecting a path through the network along which a message will travel from the source node to the destination node. Because the topology of an ad hoc network is dynamic by its nature, and because such networks are formed and maintained in a decentralized manner, routing in multi-hop ad hoc networks presents particular challenges. Wireless nodes in an ad hoc network may be mobile. Even if nodes are not moving, network links and the quality of those links may change significantly over time. These characteristics make conventional network routing protocols unsuitable.

One routing protocol that has been designed for multi-hop ad hoc networks is Dynamic Source Routing (DSR). DSR is described in an Internet Draft work in progress submitted to the Internet Engineering Task Force (IETF) Mobile Ad Hoc Networks (MANET) Working Group, "The Dynamic Source Routing Protocol for Mobile Ad Hoc Networks (DSR)" (Feb. 21, 2002), incorporated herein by reference. DSR is a reactive (on-demand) protocol that uses "source routing." In source routing, when a source node sends a packet to a destination node, the source node includes in the packet header the complete sequence of nodes that comprises the route along which the packet is to be forwarded in order to reach the destination node. Each intermediary node in the listed route forwards the packet to the next hop indicated in the header and attempts to confirm that the packet was actually received by the next node in the route.

Source routing may be contrasted with, for example, conventional routing across IP networks. In IP routing, no full source route is set forth in each packet. The packet header contains the destination address. The source node sends a packet to a nearby router. The router examines the header, consults a routing or address table to determine the next hop, updates the header, and then sends the packet towards its destination. The packet will generally pass through several routers in this manner before reaching the intended destination.

Two important elements of routing protocols like DSR are Route Discovery and Route Maintenance. The need for Route Discovery arises when a source node intends to communicate with a destination node but does not know the route to that node. In one approach, proactive route discovery, each node periodically determines its neighbors, adjusting to changes occurring in the network. DSR instead uses reactive route discovery: a node attempts to discover a route to some destination only when it has a packet to send to that destination. The source node broadcasts a route discovery request packet through its local neighborhood, and the route request propagates through the network until it reaches the target destination node. Each node receiving the request appends its own node address to a list in the request and rebroadcasts the request. When the request reaches the target node, the target sends a reply to the initiator, including the accumulated list of addresses comprising the route from the initiator to the target. When the initiator receives this reply, it stores the new route in a route cache indexed by destinations. In DSR a forwarding node can also "snoop" or overhear the content of a message and use the overheard information to populate its route cache.

Because changes in intermediary links along a route may occur, and a particular link may become broken, DSR employs a route maintenance mechanism, which is also reactive. As a packet is forwarded along a route, a forwarding node attempts to confirm whether the next node in the route actually received the packet. If it is unable to make this confirmation, a route error message is sent back to the original source node, identifying the link as broken. The source node updates its route cache to reflect this information. In sending subsequent packets to the destination, the source node may use another cached route to the destination, or it may attempt a new route discovery if necessary.

When there is more than one known route from a source node to a destination node, a routing protocol can employ one or more metrics to determine a preferred path. An algorithm such as Dijkstra's shortest path algorithm can be used in making this determination. DSR and other routing protocols for wireless ad hoc networks have mainly focused on finding paths with the least number of intermediate hops. Choosing paths that minimize hop count can lead to poor performance, however, in part because such paths tend to include wireless links between distant nodes. These long wireless links can be slow or lossy, leading to poor throughput for flows that traverse them. On the other hand, a path with a greater number of hops may feature links that are more reliable and fast. An alternative to shortest-path routing that is generally known in the networking arts is routing according to link quality.

SUMMARY OF THE INVENTION

Systems and methods for link quality source routing by nodes in an ad hoc network are provided. In one aspect of the invention, a system includes a route discovery mechanism, a route maintenance mechanism, a link quality metric maintenance mechanism, and a mechanism for calculating routes based on link quality metric information. The route discovery mechanism causes link quality measurements to propagate through the network. The route maintenance mechanism determines whether a link quality measurement for a particular link should be penalized because of a failure to transmit a packet. The metric maintenance mechanism includes both a reactive mechanism that maintains metrics for links that a node is currently using to route packets, and a proactive mechanism that maintains metrics for all links.

In another embodiment, the system includes, within a node in the ad hoc network configured to perform link quality source routing, a send buffer, a maintenance buffer, a request table, and one or more link quality metric modules. The send buffer holds data packets while route discovery is performed. The maintenance buffer is used to perform route maintenance. The request table suppresses duplicate route requests. The system may also include a neighbor cache for translating layer 2.5 virtual addresses into physical addresses. The system preferably includes a link cache, but alternatively may include a route cache augmented with link quality information.

In another embodiment, a method for route discovery is provided. The node initiating route discovery broadcasts a route request. Neighboring nodes receiving the route request append their addresses to the path listed in the route request along with link quality metric information, and these nodes rebroadcast the route request. When the target node receives the route request it sends a route reply to the initiating node, including a complete list of link quality measurements for links comprising the route to the target. The target node may send the route reply by way of an independently-discovered route from the target to the initiating node.

In another embodiment, a method for forwarding a data packet from a source node to a destination node, by way of a source route in the data packet, is provided. A forwarding node modifies the source route with one or more updated link quality measurements. When the destination node receives the packet, it updates its link cache with link quality information for the source route.

In another embodiment of the invention, a route maintenance method for a source routing protocol is provided. A forwarding node determines whether the next link in the source route fails to carry a data packet, and, if so, it penalizes the link quality metric associated with that link. The forwarding node sends a route error message carrying the penalized link quality metric to the source node.

In another embodiment, methods for sending and receiving a packet by a node are provided. In the sending method, if the packet is not a unicast packet, the node broadcasts the packet using a route request, including link quality information. If the packet is a unicast packet, and a route for the packet is cached, the node (a) places the packet in its maintenance buffer, (b) adds the source route, including link quality information, to the packet, and (c) sends the packet to the next hop in the source route. In the case of a unicast packet with no cached source route, the node (a) places the packet in its send buffer, and (b) sends a route request to discover a source route. A computer-readable medium storing computer-executable instructions for performing the sending method may be provided.

In the receiving method, the node updates its link cache with link quality information contained in the packet. If the packet is a route request, and the node is the target, the node sends a route reply, including link quality information. If the packet is a route request, and the node is not the target, the node suppresses the request if the request is a duplicate request, and if the request is not a duplicate, the node (a) adds the route request to its request table, (b) adds link quality information to the route request, and (c) rebroadcasts the route request. If the received packet is a source-routed packet, and the node is not the packet's final destination, the node (a) updates the source route with link quality information, and (b) uses its maintenance buffer to forward the packet. A computer-readable medium storing computer-executable instructions for performing the receiving method may be provided.

In yet another embodiment of the invention, a method for maintaining link quality metrics includes both reactive metric maintenance for the source route of a packet, and proactive metric maintenance for network links in general. In the reactive metric maintenance, a forwarding node updates the source route with a current link quality metric for the next link in the route. The destination node sends a gratuitous route reply to the source node containing link quality metrics for the links in the source route. The destination node may delay sending the gratuitous route reply while waiting for a piggy-backing opportunity, during which time it updates the link quality metrics for the source route as additional packets arrive from the source node. In the proactive metric maintenance, each node periodically broadcasts a link information message that carries current link quality metrics for each link from the node. The link information messages are piggy-backed on route requests, with the node generating a dummy route request if necessary.

Embodiments of the invention may reside in a virtual protocol interlayer between layers 2 and 3 of the network protocol stack and exposes a virtual Ethernet network adapter to higher layers, demultiplexing multiple physical network adapters if present. Other implementations are contemplated. The invention may use any desired link quality metric. For example, metrics based on probing techniques (such as a per-hop round-trip time metric, a per-hop packet pair delay metric, or an expected transmission count metric, each of which is known in the art) may be used. Link quality metrics may also be based on knowledge gained in ways other than through probing (such as by examining received signal strength information or senders' 802.11 retransmission counts).

The systems and methods of the present invention may be implemented in whole or in part in software, in hardware, or a combination thereof. One or more computing devices in an ad hoc network configured to implement the systems and perform the methods described are also contemplated.

DETAILED DESCRIPTION

In the following description, embodiments of the present invention will be described. For purposes of explanation, specific configurations and details are set forth in order to provide a thorough understanding of the embodiments. However, it will also be apparent to one having skill in the art that the present invention may be practiced without the specific details. Furthermore, well-known features may be omitted or simplified in order not to obscure the embodiment being described.

The present invention provides a general framework in which a link-state source routing protocol for ad hoc networks improves upon DSR and other ad hoc routing protocols by permitting implementation of link quality metrics to determine routing paths. Certain aspects of the present invention and related work have been described in the MobiSys 2004 conference paper submission, "Comparison of Routing Metrics for Multi-Hop Wireless Networks," incorporated herein by reference. The routing protocol associated with the present invention as well as embodiments implementing and incorporating this protocol shall be referred to herein as Link Quality Source Routing (LQSR).

Figure 1:
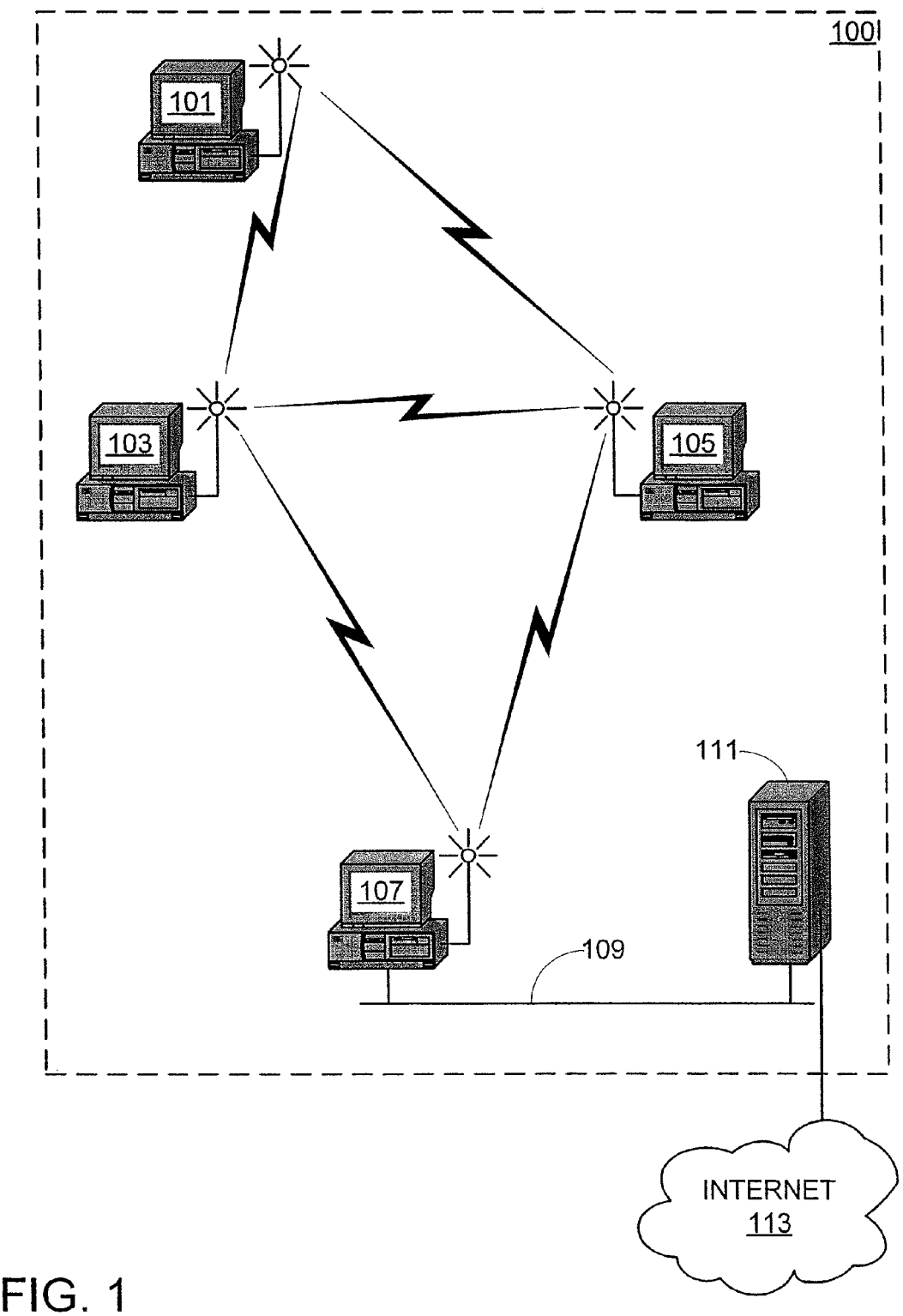
FIG. 1 is a diagram illustrating a simplified exemplary network environment supporting both wired and wireless nodes, within which the present invention may be incorporated.

A simple illustration of one possible network communications environment within which the present invention may be practiced is shown in FIG. 1. In the ad hoc network 100, nodes 101, 103, 105, and 107 communicate wirelessly with one another (as implied by the zigzag lines, representing wireless links between the nodes). The node 107 also has a wired local area network (LAN) connection 109 to another device 111. Through the device 111, the ad hoc wireless network may be connected to the Internet 113 or some other second network.

The ad hoc network 100 is a multi-hop network, in that communications between two particular nodes may be routed by one or more intermediary nodes. It can be seen in FIG. 1 that, for example, there is no single-hop link between nodes 107 and 101. As is well-known, links between nodes in an ad-hoc network generally vary in quality, and a route comprising a greater number of links may represent a higher-quality route than one comprising fewer links. For example, it is possible that, at a particular point in time, the two-hop route from node 103 to node 105 in which node 101 is the intermediary node is a faster or more reliable route than the one-hop direct link between nodes 103 and 105.

The network environment depicted in FIG. 1 is simple for illustrative purposes. The invention is applicable to other configurations of multi-hop ad hoc networks, including those with greater numbers of nodes and more complex topologies. It should be borne in mind that in such networks the existence and quality of links between nodes are dynamic in nature. It should also be noted that a node in such a network may have multiple transceivers, and that a link from a first node to a second node may be asymmetric with respect to a link from the second node to the first node. Such possible details have not been shown in the simplified diagram of FIG. 1. Finally, it will be appreciated by those having skill in the art that the nodes 101, 103, 105, 107 and 111 of the network 100 are computing devices that may be of any number of general-purpose or special-purpose configurations and architectures.

Figure 2:
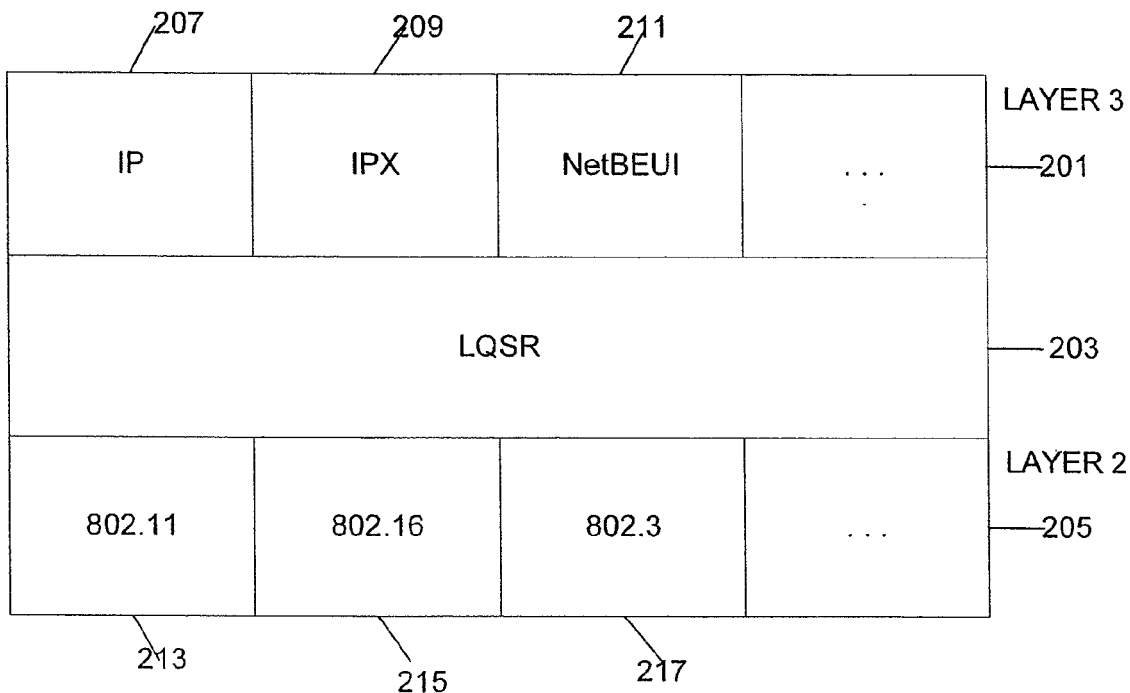
FIG. 2 is a diagram situating an embodiment of the present invention within the protocol stack of the ISO/OSI Reference Model.

FIG. 2 provides a view of an embodiment of the invention as situated within a network node illustrated as having a network protocol stack conforming to the ISO/OSI Reference Model. In the OSI model, as is well-known, networking protocols are conceptually situated within a hierarchy of seven logical layers. Units of data are passed across interfaces between the layers. In general, as a data unit is passed down a source node from higher to lower layers it is successively encapsulated at each layer in accordance with protocols associated with that layer, and it is actually transmitted at the lowest layer. At the destination node it is passed up the layers and successively stripped of its encapsulating headers. Two of the OSI layers are depicted in FIG. 2. Layer 3 is the network layer 201, containing such protocols as IP 207, NetBEUI 209, and IPX 211. Layer 2 is the data link layer 205, at which such protocols as IEEE 802.11 (wireless LANs) 213, IEEE 802.16 (broadband wireless) 215, and IEEE 802.3 (Ethernet) 217 are implemented. In the illustrated embodiment, LQSR 203 conceptually operates between these two layers at layer 2.5.

In one embodiment, LQSR is implemented at layer 2.5 in a Mesh Connectivity Layer (MCL) module making use of an interposition protocol layer architecture. Certain aspects of methods and systems associated with this architecture are described in commonly-owned U.S. patent application Ser. No. 10/610,397, "Method and System for Providing a Virtual Protocol Interlayer," filed on Jun. 30, 2003, which has an inventor in common with the present invention, and disclosure of which is incorporated herein by reference. However, the present invention is susceptible to other implementations, including other implementations at layers 2, 2.5, and 3.

Figure 3:
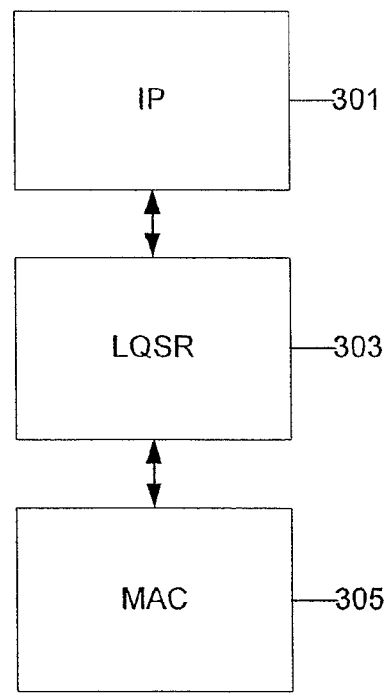
FIG. 3 is a diagram showing an embodiment of the present invention as including an interface between IP and MAC layers.

A similar architectural view of an embodiment of the present invention is given in FIG. 3. Within a network node, MCL/LQSR 303 functions as an interface between IP 301 above and the MAC layer 305 below. Due to the layer 2.5 architecture, LQSR packet headers use 48-bit virtual Ethernet addresses (distinct from layer 2 addresses of any underlying physical adapters) instead of 32-bit IP addresses. To IP and other upper-layer protocols and applications, MCL/LQSR thus exposes a virtual Ethernet network adapter, permitting them to run unmodified over the ad hoc network.

Figure 4:
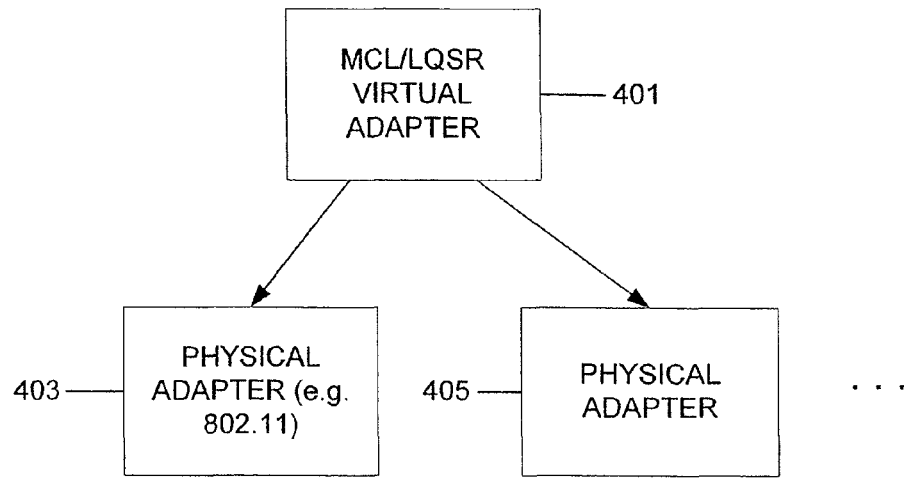
FIG. 4 is a diagram showing an embodiment of the present invention as a virtual adapter that demultiplexes multiple physical adapters.

As generally illustrated in FIG. 4, the virtual adapter 401 can also demultiplex multiple physical network adapters 403, 405 into the single virtual link. The design thus permits ad hoc routing to run over heterogeneous link layers. To support multiple physical network interfaces per node, the 48-bit addresses are augmented with 8-bit interface indices. Each node locally assigns interface indices to its physical network adapters. If two nodes in the network are equipped with multiple radios, for example, they may be connected by multiple links. To uniquely specify a link, LQSR requires the source virtual address, the outgoing interface index, the incoming interface index, and the destination virtual address. Because LQSR packet headers never use or represent physical layer 2 addresses, LQSR makes no assumptions about the properties of layer 2 addressing. The underlying physical links may use addresses of any length, or not have addresses at all.

Figure 5:
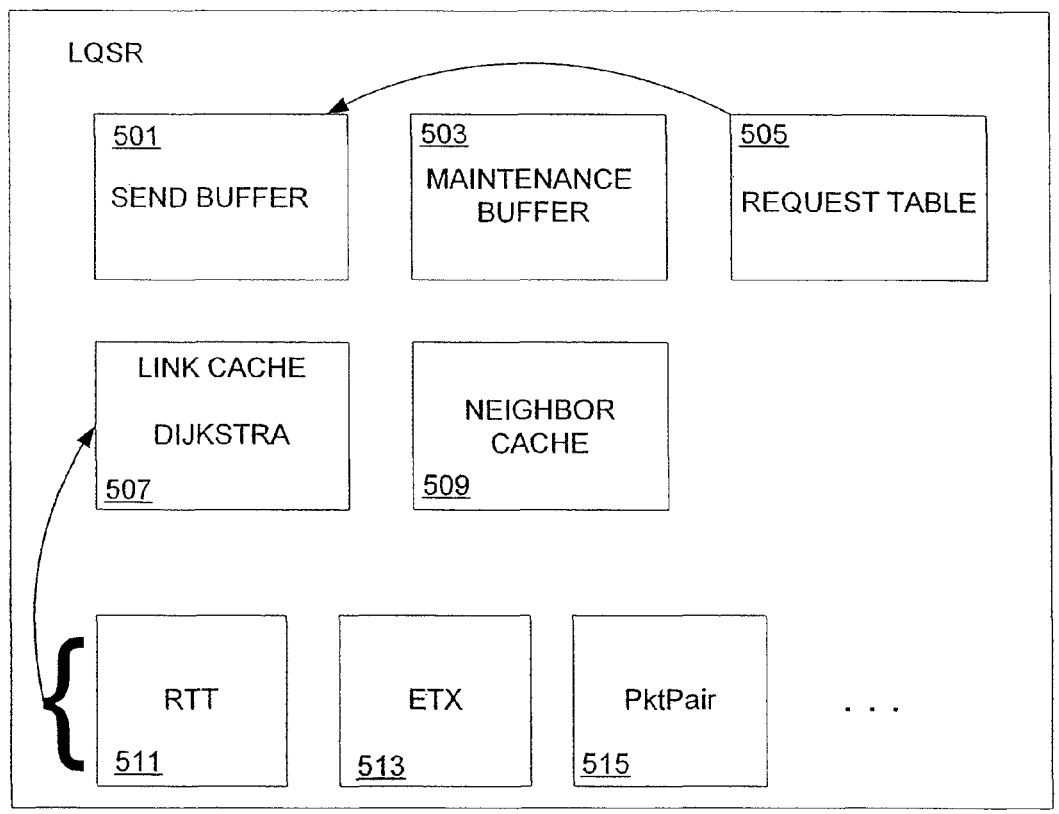
FIG. 5 is a block diagram illustrating components and conceptual data structures in accordance with an embodiment of the invention.

LQSR implements the basic DSR functionality, including Route Discovery (Route Request and Route Reply messages) and Route Maintenance (Route Error messages). FIG. 5 generally illustrates the components and conceptual data structures employed in an embodiment of the present invention. A send buffer 501 holds packets while LQSR performs Route Discovery. A maintenance buffer 503 performs Route Maintenance, keeping track of Ack Requests and Ack Replies in order to determine whether a link is working. The request table 505 suppresses duplicate Route Requests.

LQSR preferably uses a link cache rather than a route cache. As shown in FIG. 5, a link cache 507 holds a graph of the local topology, permitting discovery of links for different possible routes between nodes. In an embodiment, Dijkstra's algorithm is used to compute routes by minimizing the metrics associated with the links making up a particular path. In an alternative embodiment, a route cache augmented with link quality metric information is used instead of a link cache. In an embodiment, a neighbor cache 509 translates virtual layer 2.5 addresses to physical layer 2 addresses. The neighbor cache 509 is consulted when a node sends an LQSR packet to a neighbor. One or more link metric modules 511, 513, 515 measure the quality of links from the node to its neighbors. The link metric modules provide input to the routing computation associated with the link cache 507. Each particular link metric module corresponds to a particular approach to measuring link quality. For illustrative purposes, FIG. 5 depicts three link metric modules that employ known probing techniques: RTT 511, ETX 513, and PktPair 515, described further below. In an embodiment, the link cache does not use an adaptive link timeout algorithm such as Link Maxlife. Instead, an infinite metric value is used to denote broken links in the cache. Dead links in the cache are periodically garbage-collected.

LQSR modifies DSR in several ways in order to support routing according to link-quality metrics. Route Discovery and Route Maintenance are modified, and new mechanisms are provided for Metric Maintenance. In addition, the LQSR design does not assume that the link-quality metric is symmetric for a given pair of nodes.

LQSR Route Discovery supports link quality metrics by providing a mechanism for the propagation of link quality information. Route Request and Route Reply messages are augmented to carry this information. Such augmentation may be explained by way of a simple case in which a source node A sends a Route Request to a neighbor B. When B receives the Route Request, it appends its own address to the path listed in the request, and it also adds the metric for the link from A to B over which the packet arrived. B then rebroadcasts the Route Request. The Route Request is received by B's neighbor C, and C also updates the path including the quality of the link from B to C. When the Route Request finally reaches the target node, it contains a list of nodes comprising the route along with link quality information for that route. The target node sends a Route Reply to the originator of the Route Request, carrying back the complete list of link metrics for the route.

In one embodiment, certain features of Route Discovery in DSR are omitted. An LQSR node does not reply to a Route Request from its link cache; only the target of a Route Request sends a Route Reply. Moreover, an LQSR node does not send Route Requests with a hop limit to restrict their propagation. Route Requests always flood throughout the ad hoc network. In other embodiments of the invention, however, these omitted features can be implemented. Snooping in LQSR includes gaining knowledge about link quality. LQSR nodes cache information from overheard Route Requests.

The source route field of LQSR data packets also includes link quality information. Each forwarding node modifies the source route with updated link quality measurements. When the packet is received by the destination node, this node has the most recent possible knowledge of link quality metrics along the source route path. For example, if a packet is sent from node A to node C by way of the route A→B→C, when C receives the packet C has up-to-date knowledge regarding links A→B and B→C. C updates its link cache with this information. In addition, all nodes that "overhear" the source route will update their link caches.

Adding support for link metrics also affects the design and implementation of LQSR Route Maintenance. In DSR links are binary: either a link is working or it is not working. With respect to link quality, however, a link should be regarded as existing on a continuum from poor quality to good quality. When Route Maintenance detects a transmission failure with respect to a data packet, it penalizes the metric associated with that link and sends a Route Error. The Route Error carries the updated, penalized metric for that link back to the source of the packet. In one embodiment, the penalty comprises increasing the value of the metric on that link by 20 percent.

LQSR Route Maintenance may use various techniques for detecting a packet transmission failure. Some embodiments of the invention are designed to work with Microsoft Windows® 802.11 drivers, which do not support promiscuous mode and do not indicate whether a packet was successfully transmitted. In these embodiments, Route Maintenance may use explicit acknowledgements instead of passive acknowledgements or link layer acknowledgements. Every source-routed packet carries an Ack Request option. A node expects an Ack from the next hop within a period of time (500 ms in one embodiment). The Ack options are delayed briefly (up to 80 ms in an embodiment) so that they may be piggybacked on other packets flowing in the reverse direction. Later Acks squash (replace) earlier Acks that are waiting for transmission. As a result of these techniques, the acknowledgement mechanism does not add significant byte or packet overhead. If a requested Ack has not been received, Route Maintenance penalizes the metric for the associated link.

As with Route Discovery, embodiments of LQSR Route Maintenance omit some optimizations present in DSR. Embodiments that do not support promiscuous mode do not implement Automatic Route Shortening, which would allow a node to send a gratuitous Route Reply when it overhears a source-routed packet before it is routed to that node. LQSR nodes do not implement "Increased Spreading of Route Error Messages," which would piggyback the most recently received Route Error on the next Route Request. This is not important because an LQSR node will not reply to a Route Request from (possibly stale) cached data. When LQSR Route Maintenance detects a broken link, it does not remove from the transmit queue other packets waiting to be sent over the broken link (the Windows™ driver model does not provide access to the transmit queue). However, LQSR nodes learn from Route Error messages that they forward.

LQSR supports a form of Packet Salvaging or retransmission. When a node is forwarding a source-routed packet and discovers that the next hop is not reachable, Packet Salvaging allows the node to try forwarding the packet by way of a different route. The acknowledgement mechanism does not allow every packet to be salvaged because it is primarily designed to detect when links fail. When sending a packet over a link, if the link has recently been confirmed to have carried a packet (within 250 milliseconds in one embodiment), an Ack is requested as usual but the packet is not buffered for possible salvaging. This design allows for salvaging of the first packets in a new connection and salvaging infrequent connectionless communication, while relying on transport-layer retransmission for active connections.

Link metrics change considerably over time, even with respect to non-mobile nodes. Once Route Discovery populates a node's link cache, the cached link metrics must be kept reasonably up-to-date for the node's routing to remain accurate. LQSR uses two separate Metric Maintenance mechanisms. In combination, the two mechanisms ensure that a node uses good routes despite changes in link quality metrics.

The primary Metric Maintenance mechanism maintains metrics for links that a node is actively using to route its packets. For example, the route from A to C may have become worse because link A→B has become worse. If node A knows this, it can then switch to an alternate route. The mechanism used is reactive. When a node sends a source-routed packet, each intermediate node updates the source route with the current metric for the next (outgoing) link. This carries up-to-date link metrics forward with the data. To transmit the link metrics back to the source of the data packet flow (where they are needed for the routing computation), the recipient of a source-routed packet sends a gratuitous Route Reply that conveys the up-to-date link metrics for the complete arriving source route. The gratuitous Route Reply is delayed for a constant time interval (up to one second in an embodiment) while the node sending the reply waits for a piggybacking opportunity. While holding on to the gratuitous Route Reply, the node updates' the link metric information as additional packets arrive from the source. This design keeps overhead low while keeping the source of a packet flow informed about changes in link metrics along the route.

A secondary, proactive Metric Maintenance mechanism maintains the metrics of other links. This is useful, and more reliable than snooping, in cases where an alternate route that is not being used due to its poor metrics improves so much that it becomes better than the currently-used route. Each LQSR node occasionally sends a Link Info message. The Link Info carries current metrics for each link from the originating node, including broken links with an infinite metric. The Link Info is piggybacked on a Route Request, so it floods the neighborhood of the node. The node attempts to piggyback Link Info messages on all Route Requests, if there is room in the packet. If a node has not sent a Link Info for a sufficiently long time interval (10 seconds in one embodiment), then it generates a dummy Route Request for the purpose of carrying a Link Info message.

In an ad hoc network a link between two nodes may be asymmetric. One possibility is that a link is actually unidirectional: node A might be able to send to node B, but node B might not be able to send to node A. More commonly, there will be asymmetry in link qualities. A→B might be a high-quality link, while B→A might be of poor quality. This might occur, for example, if A has a superior transmitter but there is a source of interference near A. Link quality asymmetry of this sort is unlikely to occur in purely wired networks but is typical in wireless networks.

The present invention addresses the possibility of asymmetric links. Route Replies are sent using an independently discovered source route instead of simply reversing the route in the reply. Similarly, an Ack option may take a different (multi-hop) path back instead of reversing the one-hop path by which the Ack Request option arrived. LQSR therefore does not need the DSR Blacklist mechanism for detecting and avoiding asymmetric links.

Figure 6:
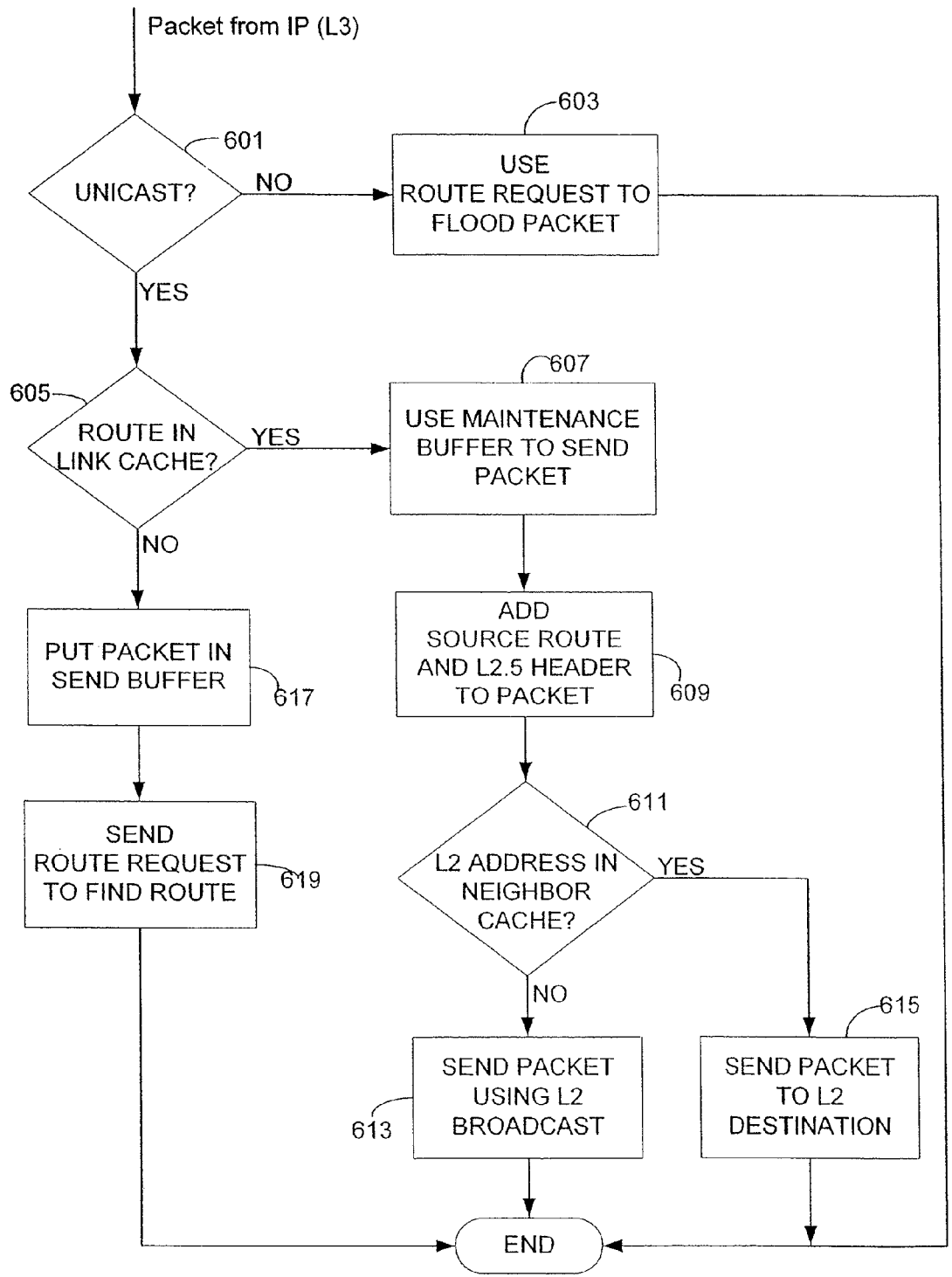
FIG. 6 is a flowchart showing steps for sending a data packet in accordance with an embodiment of the invention.

FIG. 6 is a flowchart generally showing steps for sending a data packet by an LQSR node in accordance with an embodiment of the invention, and illustrating various features of the invention discussed above. At step 601, the node determines whether a packet from layer 3 is a unicast or a broadcast/multicast packet. If it is a broadcast or multicast, at step 603 the node uses a Route Request to flood the packet. Otherwise, at step 605 the node determines whether a route to the destination is in the link cache. If the route is not cached, at step 617 the node places the packet in the send buffer, and at step 619 the node sends a Route Request to discover a route. If the route is cached, at step 607 the node uses the maintenance buffer to send the packet. At step 609 the node adds the source route and layer 2.5 header to the packet. If the layer 2 address of the next hop is in the neighbor cache (step 611), the node sends the packet to that address. Otherwise, if no layer 2 translation for the neighbor is known, the node sends the packet using a layer 2 broadcast at step 613.

Figure 7:
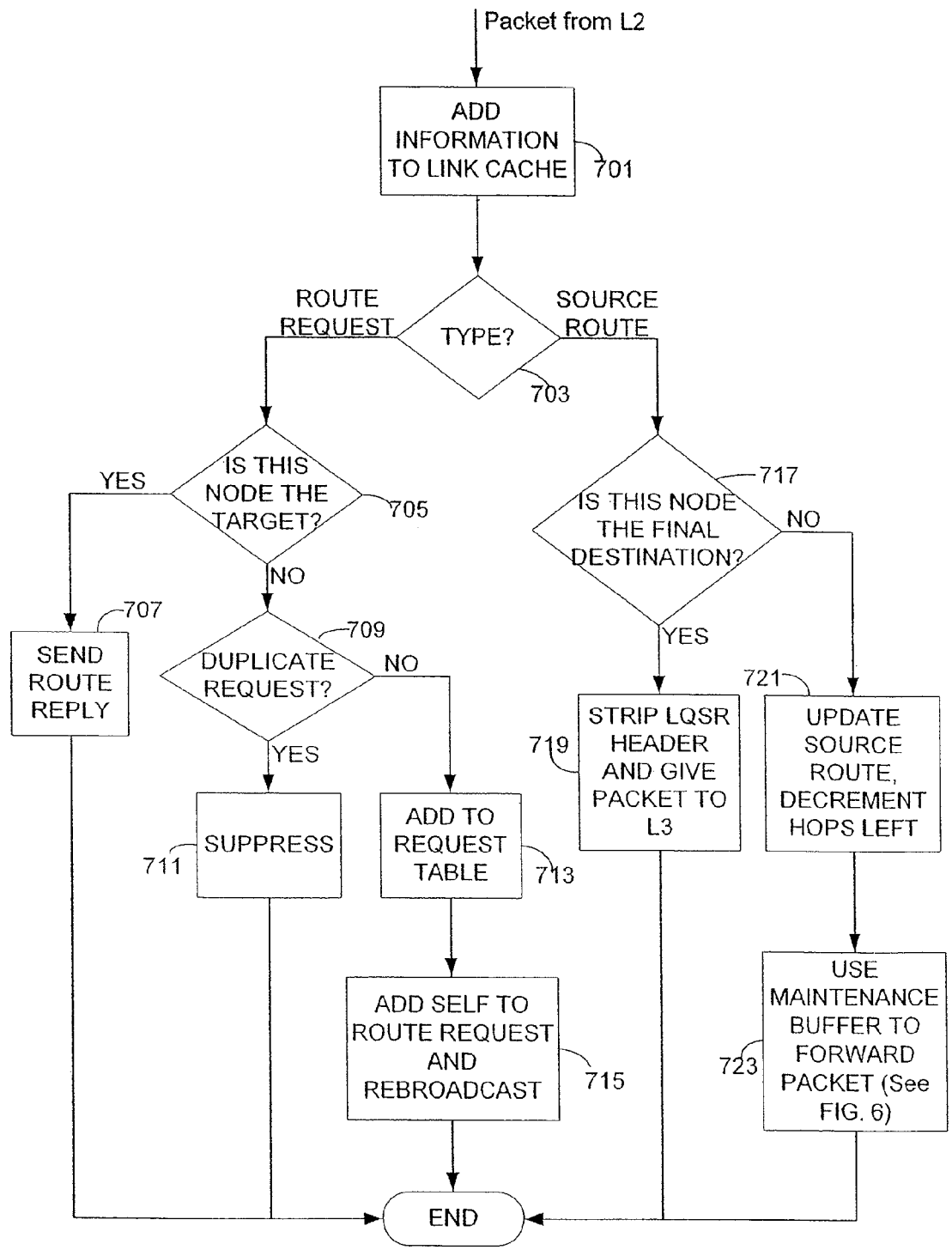
FIG. 7 is a flowchart showing steps for receiving a packet in accordance with an embodiment of the invention.

FIG. 7 is a flowchart generally showing steps for receiving a packet by an LQSR node in accordance with an embodiment of the invention, and illustrating various features of the invention discussed above. When a packet from layer 2 is received, information is added to the link cache at step 701. The node determines whether the packet represents a Route Request or a Source Route (step 703). If it is a Route Request, and the node is the target (step 705), the node sends a Route Reply at step 707. If the node is an intermediary node, the node checks its request table to determine whether the Route Request is a duplicate of a previously-received request (step 709). If it is a duplicate request, the request is suppressed at step 711. Otherwise, at step 713 the node adds the request to the request table, and at step 715 the node adds itself to the Route Request and rebroadcasts it.

If the packet is a Source Route message, at step 717 the node determines whether it is the final destination. If so, at step 719 the node strips the LQSR header and gives the packet to layer 3. Otherwise, at step 721 the node updates the source route and decrements the remaining number of hops, and at step 723 the node uses the maintenance buffer to forward the packet, beginning at step 607 in FIG. 6.

Figure 8:
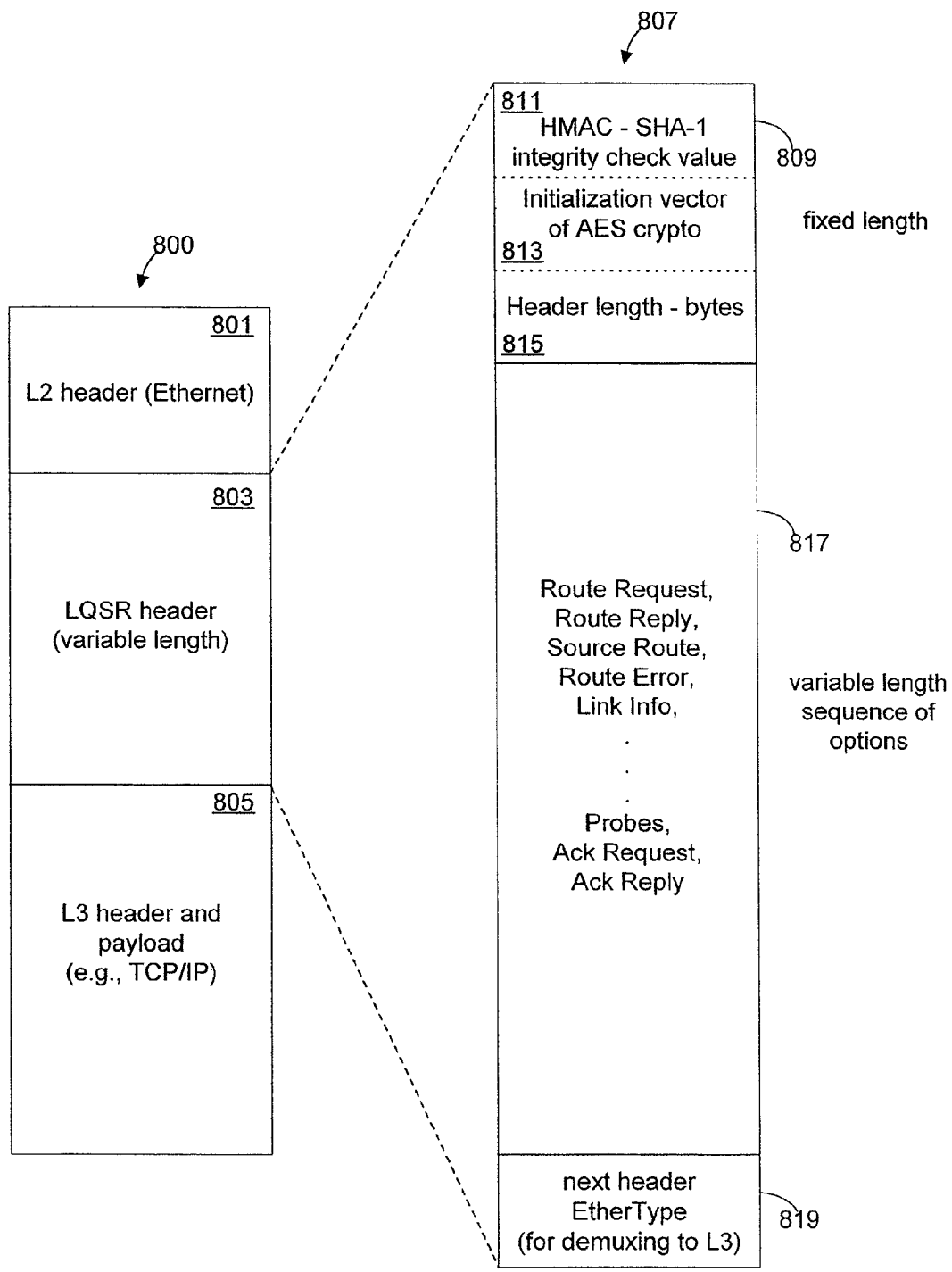
FIG. 8 is a diagram illustrating the format of packets in accordance with an embodiment of the invention.

FIG. 8 is a diagram generally illustrating the format of packets in an embodiment of the invention. The packet 800 comprises a layer 2 (Ethernet) header 801, followed by a variable-length LQSR header 803, followed by the layer 3 header and packet payload 805. The LQSR header 807 begins with a fixed-length section 809. All nodes along the path of a data flow sign each packet with an integrity check value 809, which in one embodiment involves the use of HMAC with the SHA-1 cryptographic hash function. Each node regenerates the hash to reflect changes in the LQSR headers when forwarding the packet. Additionally, the end nodes encrypt or decrypt the payload data, using AES-128 in one embodiment. The initialization vector 813 associated with the encryption is stored in the fixed-length section 809. The fixed-length section includes the header length 815 in bytes. Following the fixed-length section 809 is a variable-length section 817, which comprises a sequence of options (including Route Request, Route Reply, Source Route, Route Error, Link Info, Probes, Ack Request, and Ack Reply). Following the variable-length section 817 is a field 819 holding the EtherType of the next header, used for demultiplexing to layer 3.

Embodiments of the present invention may use link quality metrics of various kinds. Link quality may be measured by way of probing techniques, for example. Metrics may also be based on knowledge gained in ways other than through probing. For example, link quality measurements may be based on examination of received signal strength information, or on senders' 802.11 retransmission counts. In some cases, a link quality metric module may actively measure the quality of links; in other cases, the module may make use of information that is already available in the link layer.

In one embodiment of the invention, three link quality metrics based on probing techniques known in the art are supported: ETX, RTT, and PktPair. In addition, the embodiment supports a HOP metric for minimum hop count routing. Each metric represents a different notion of what constitutes good link quality. A node is configured to use only one of these metrics at any given time.

The RTT metric (Per-hop Round Trip Time) is based on a measurement of the round trip delay seen by unicast probes between neighboring nodes. This metric was previously disclosed in commonly-owned U.S. patent application Ser. No. 10/723,673, Wolman et al., "Multi-Radio Unification Protocol," filed on Nov. 26, 2003, which has an inventor in common with the present application. The disclosure in this application is incorporated herein by reference. The RTT metric was also disclosed in the paper A. Adya, P. Bahl, J. Padhye, A. Wolman and L. Zhou, "A Multi-Radio Unification Protocol for IEEE 802.11 Wireless Networks," Technical Report MSR-TR-2003-44, Microsoft Research, July 2003, incorporated herein by reference.

Figure 9A:
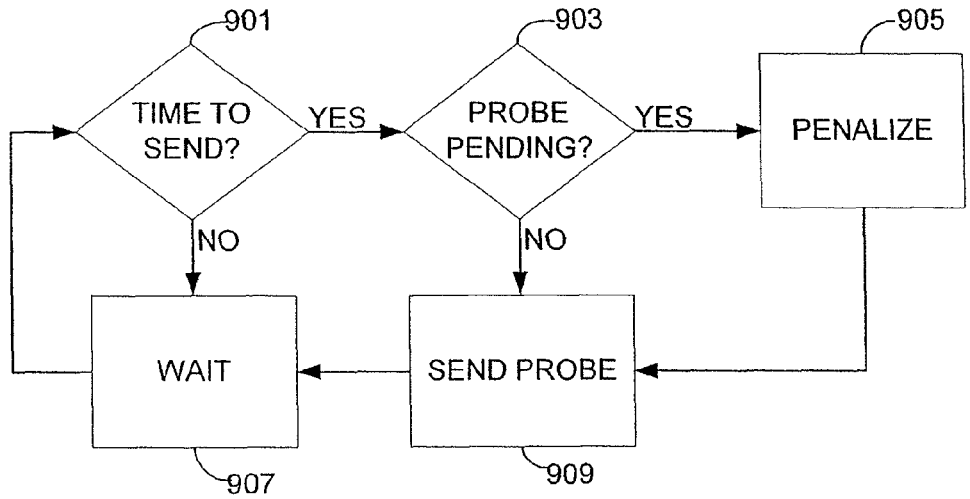
FIG. 9A is a flowchart showing steps for an RTT probe send operation in accordance with an embodiment of the invention.

FIG. 9A is a flowchart generally showing steps for an RTT probe send operation by a node in accordance with an embodiment of the invention. To calculate RTT, a node periodically sends a probe packet carrying a timestamp to each of its neighbors; in one embodiment, a probe packet is sent every 500 milliseconds. With respect to a particular neighbor, as represented in FIG. 9A, at step 907 the node waits until a timer expires at step 901. If a previously-sent RTT probe to the neighbor is pending (step 903), the node penalizes the metric for the link to that neighbor (step 905). At step 909 the node sends the RTT probe to the neighbor.

Figure 9B:
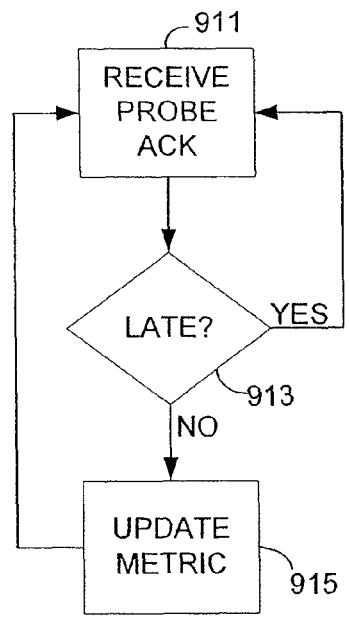
FIG. 9B is a flowchart showing steps for an RTT probe receive operation in accordance with an embodiment of the invention.

FIG. 9B is a flowchart generally showing steps for an RTT probe receive operation by a node in accordance with the invention. When a neighbor receives a probe, the neighbor immediately responds to the probe with a probe acknowledgment echoing the timestamp. At step 911 the sending node receives the probe ack. This enables the sending node to measure round trip time to this neighbor. If the probe ack is not late (step 913), the sending node updates the metric for the corresponding link at step 915. The sending node keeps an exponentially weighted moving average of the RTT samples to each of its neighbors. The average computation is as follows:

Average=0.1×RTT Sample+0.9×Average

The routing algorithm selects the path with the least total sum of RTTs. In one embodiment, the size of a probe packet is 137 bytes.

The RTT metric measures several different facets of link quality. First, if either the node or the neighbor is busy, the probe or the probe-ack packet will experience queuing delay, resulting in high RTT. Second, if other nodes in the vicinity are busy, the probe or the probe-ack packet will experience delays due to channel contention, again resulting in high RTT. Third, if the link between the nodes is lossy, the 802.11 ARQ mechanism may have to retransmit the probe or the probe-ack packet several times to have it delivered correctly. This also increases the RTT along that hop. Finally, if, despite the ARQ mechanism, a probe or a probe-ack packet is lost, the Route Maintenance mechanism for the sending node detects the packet loss and updates the moving average by imposing a penalty. In short, the RTT metric is designed to avoid highly-loaded or lossy links.

Figure 10A:
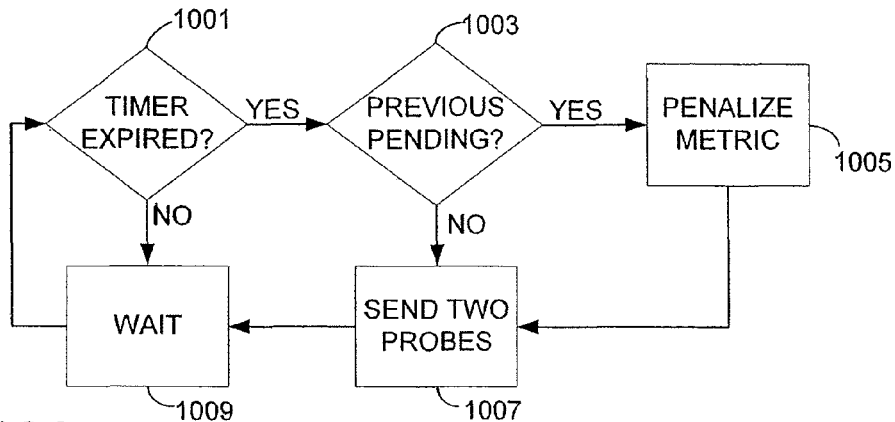
FIG. 10A is a flowchart showing steps for a PktPair send operation in accordance with an embodiment of the invention.

The PktPair (Per-hop Packet Pair Delay) metric is based on a measurement of the delay between a pair of back-to-back probes to a neighboring node. It is designed to correct the problem of distortion of RTT measurement due to queuing delays. The packet-pair technique is well-known in the wired networking arts, and is described in, for example, S. Keshav, "A Control-Theoretic Approach to Flow Control", ACM SIGCOMM, September 1991. FIG. 10A is a flowchart generally showing steps for a PktPair send operation by a node in accordance with an embodiment of the invention. To calculate the PktPair metric, a node periodically sends two probe packets back-to-back to each neighbor; in an embodiment, the probe packets are sent every two seconds. As represented in FIG. 10A, with respect to a particular neighbor, at step 1009 the node waits until a timer expires at step 1001. At step 1003 the node determines whether a pair of probes previously sent to the neighbor are still pending. If so, the metric for the link to that neighbor is penalized at step 1005. At step 1007 the node sends the two probes. The first probe packet is small and the second packet is large (137 bytes and 1000 bytes, respectively, in one embodiment).

Figure 10B:
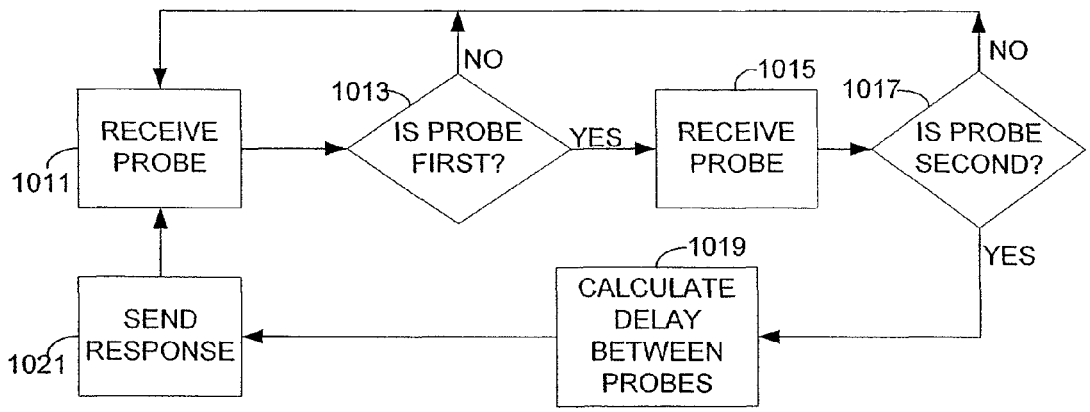
FIG. 10B is a flowchart showing steps associated with receiving PktPair probes in accordance with an embodiment of the invention.

FIG. 10B is a flowchart generally showing steps associated with receiving the PktPair probes by a neighbor node in accordance with an embodiment of the invention. At step 1011 the neighbor receives a probe. If this is the first probe packet (step 1013), the neighbor starts a timer. At step 1015 the neighbor receives a probe, and if this is the second probe in the pair (step 1017), the neighbor stops the timer. At step 1019 the neighbor calculates the delay between the receipt of the first and second packets (i.e., the value of the timer). At step 1021 the neighbor sends this delay value back to the sending node.

Figure 10C:
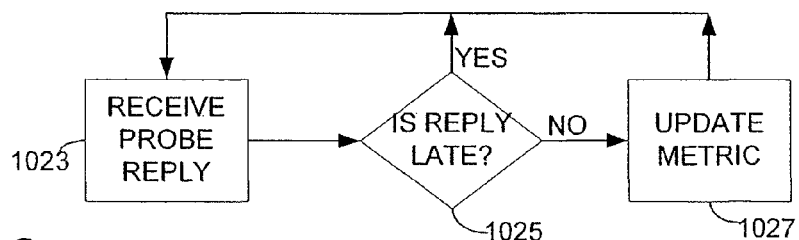
FIG. 10C is a flowchart showing steps for receiving a PktPair probe reply in accordance with an embodiment of the invention.

FIG. 10C is a flowchart generally showing steps for receiving the probe reply by the sending node. At step 1023 the node receives the response from the neighbor. If the reply is not late (step 1025), the node updates the metric for the link to that neighbor at step 1027. The sending node maintains an exponentially weighted moving average of these delay values for each of its neighbors, using the averaging equation described above in the discussion of the RTT metric. The objective of the routing algorithm is to minimize the sum of these delays. If, due to high loss rate, the second probe packet requires retransmissions by 802.11 ARQ, the delay measured by the neighbor will increase. If the link from the node to its neighbor has low bandwidth, the second packet will take more time to traverse the link, which will result in increased delay. If there is traffic in the vicinity of this hop, it will also result in increased delay, since the probe packets must contend for the channel.

Figure 11A:
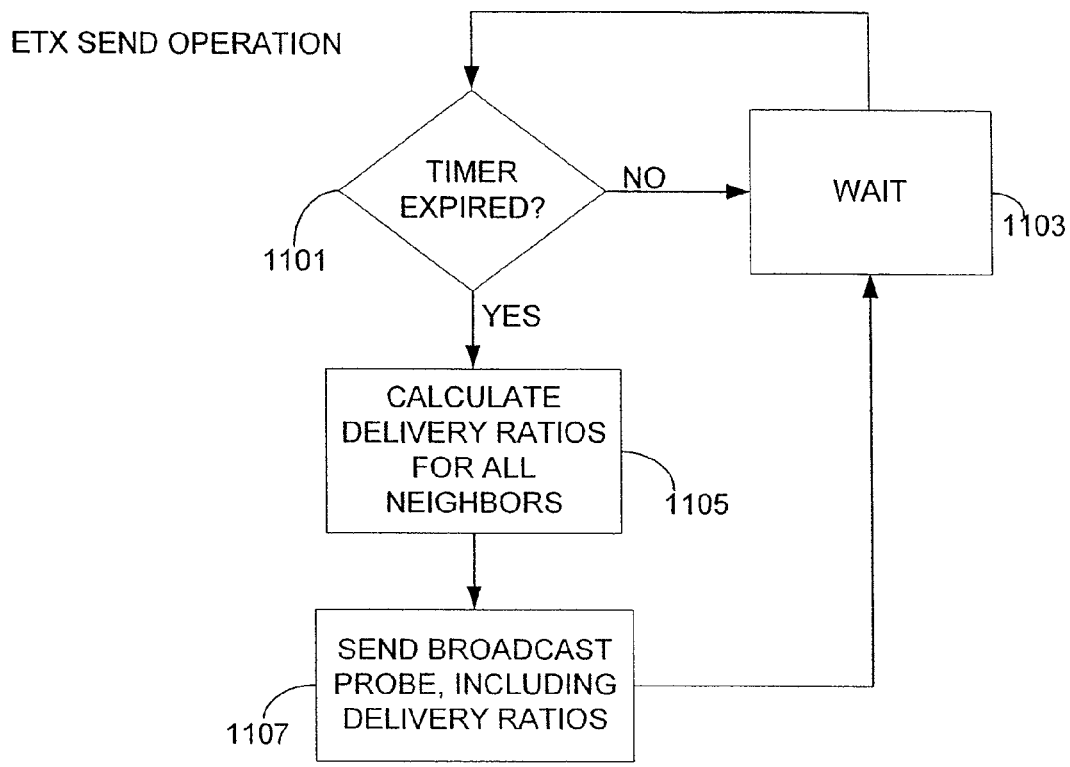
FIG. 11A is a flowchart showing steps for an ETX send operation in accordance with an embodiment of the invention.

The ETX (Expected Transmission Count) metric is based on a measurement of the loss rate of broadcast packets between pairs of neighboring nodes. The ETX metric was disclosed in D. S. J. DeCouto, D. Aguayo, J. Bicket, and R. Morris, "High-Throughput Path Metric for Multi-Hop Wireless Routing," ACM MOBICOM, September 2003. FIG. 11A is a flowchart generally showing steps for an ETX send operation by a node in accordance with an embodiment of the invention. To compute ETX, each node periodically broadcasts a probe packet; in one embodiment, a probe packet is broadcast every second. As represented in FIG. 11A, a node determines whether a timer has expired at step 1101, and, if not, waits at step 1103. When the timer has expired, at step 1105 the node calculates delivery ratios for all neighbors, and at step 1107 the node broadcasts the probe, containing the delivery ratios. The node waits at step 1103 until the timer expires again at step 1101.

Figure 11B:
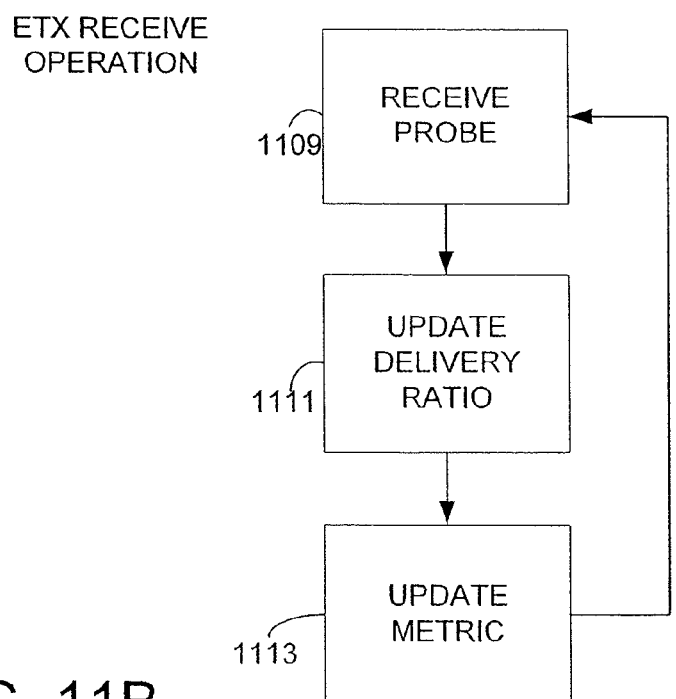
FIG. 11B is a flowchart showing steps for an ETX receive operation in accordance with an embodiment of the invention.

FIG. 11B is a flowchart generally showing steps for an ETX receive operation by a node in accordance with an embodiment of the invention. At step 1109 the node receives a probe from a neighbor. At step 1111 the node updates the delivery ratio for that neighbor, and at step 1113 the node updates the metric for the corresponding link. A node thus calculates a new ETX value for the link to a neighbor every time it receives a probe from that neighbor. The delivery ratio for a particular neighbor is based on the count of probes received from the neighbor in a previous period (a ten-second period in one embodiment). Based on these probes, a node can calculate the loss rate of probes on the links to and from its neighbors.

The ETX broadcast packets are not retransmitted by the 802.11 ARQ mechanism. This allows the node to estimate the number of times the 802.11 ARQ mechanism will retransmit a unicast packet. The routing protocol finds a path that minimizes the sum of the expected number of retransmissions. In one embodiment, the node maintains an exponentially weighted moving average of ETX samples, using the same averaging equation as in the RTT metric. The ETX metric tends to choose the same path between a pair of nodes, as long as the link qualities do not change drastically. Thus, if several TCP transfers are carried out between the same pair of nodes at different times, they should yield similar throughput using ETX.

The HOP metric is a simple metric that selects the shortest path between a pair of nodes, providing minimum hop count routing. If multiple shortest paths are available, the metric simply chooses the first one it finds. This introduces a certain degree of randomness in the performance of the HOP metric. If multiple TCP transfers are carried out between a given pair of nodes, the HOP metric may select different paths for each transfer. Under the HOP metric, link quality is a binary concept: a link either exists or does not exist. When LQSR uses the HOP metric, its behavior is similar to standard DSR. LQSR does not send Link Info messages in this case, but it does include a metric value of 1 for each hop in Route Request, Route Reply, and Source Route messages, and a value of infinity in Route Error messages.

Other variations are within the spirit of the present invention. Thus, while the invention is susceptible to various modifications and alternative constructions, a certain to illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references cited herein, including publications, patent applications, and patents, are hereby incorporated by reference to the same extent as if each reference were individually and specifically indicated to be incorporated by reference and were set forth in its entirety herein.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those having ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for link-state source routing in an ad hoc network, the system comprising:
    a send buffer that holds packets while route discovery is performed;
    a maintenance buffer that is used for route maintenance;
    a request table that is used to identify duplicate route discovery requests;
    at least one link quality metric module that determines quality of links to neighboring nodes; and
    a neighbor cache for translating layer 2.5 virtual addresses into physical addresses,
    wherein the link-state source routing is performed using the layer 2.5 virtual addresses,
    wherein a forwarding node is configured to modify a source route with one or more updated link quality measurements,
    wherein a destination node is configured to update the destination node's link cache with link quality information for a source route, and to send to a source node a route reply message that conveys link quality information for the source route, and
    wherein the route reply message is sent by way of an independently-discovered route from the destination node to the source node.

2. The system of claim 1, further comprising a link cache.

3. The system of claim 1, further comprising a route cache that stores link quality metric information.

4. The system of claim 1 wherein the at least one link quality metric module uses a probing technique.

5. The system of claim 4 wherein the at least one link quality metric module comprises one or more of a per-hop round-trip time metric module, a per-hop packet pair delay metric module, and an expected transmission count metric module.

6. The system of claim 1 wherein the at least one link quality metric module determines quality of links based on received signal strength information.

7. The system of claim 1 wherein the at least one link quality metric module determines quality of links based on a sender's IEEE 802.11 retransmission counts.

8. In a multi-hop ad hoc network, a method for discovery of a route from a first node to a target node, the method comprising:
    broadcasting, by the first node, a route request message;
    receiving, by a neighboring node, the route request;
    appending, by the neighboring node, an address of the neighboring node to a path listed in the route request, and adding a link quality measurement;
    rebroadcasting, by the neighboring node, the route request;
    receiving, by the target node, the route request;

sending, by the target node, a route reply message to the first node, wherein the route reply includes a complete list of link quality measurements for links comprising the route from the first node to the target node;

by a forwarding node, modifying a source route with one or more updated link quality measurements; and by the target node, updating the target node's link cache with link quality information for the source route, wherein the link quality information is conveyed using layer 2.5 virtual addresses, and wherein the route reply message is sent by way of an independently-discovered route from the target node to the first node.

9. The method of claim 8 wherein the sending the route reply to the first node is by way of an independently-discovered source route from the target node to the first node.

10. The method of claim 8 wherein the link quality measurement is based on a probing technique.

11. The method of claim 10 wherein the link quality measurement is based on one of a per-hop round-trip time metric, a per-hop packet pair delay metric, and an expected transmission count metric.

12. The method of claim 8 wherein the link quality measurement is based on received signal strength information.

13. The method of claim 8 wherein the link quality measurement is based on a sender's IEEE 802.11 retransmission counts.

14. In a multi-hop ad hoc network, a method for conveying link quality information for a source route listed in a data packet, the source route originating at a source node and ending at a destination node, the method comprising:

by a forwarding node, modifying the source route with one or more updated link quality measurements; and by the destination node, updating the destination node's link cache with link quality information for the source route, and sending to the source node a route reply message that conveys link quality information for the source route, wherein the link quality information is conveyed using layer 2.5 virtual addresses, and wherein the route reply message is sent by way of an independently-discovered route from the destination node to the source node.

15. The method of claim 14 wherein the one or more updated link quality measurements are based on a probing technique.

16. The method of claim 15 wherein the one or more updated link quality measurements are based on one of a per-hop round-trip time metric, a per-hop packet pair delay metric, and an expected transmission count metric.

17. The method of claim 14 wherein the one or more updated link quality measurements are based on received signal strength information.

18. The method of claim 14 wherein the one or more updated link quality measurements are based on a sender's IEEE 802.11 retransmission counts.

* * * * *